(12) United States Patent
Frankel et al.

(10) Patent No.: US 11,026,001 B1
(45) Date of Patent: Jun. 1, 2021

(54) SYSTEMS AND METHODS FOR INCREASING GRANULARITY AND FAN-OUT OF ELECTRIC CIRCUITS WITH CO-PACKAGED OPTICAL INTERFACES

(71) Applicant: Ciena Corporation, Hanover, MD (US)

(72) Inventors: Michael Y. Frankel, Bethesda, MD (US); Eric Maniloff, Stittsville (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/704,442

(22) Filed: Dec. 5, 2019

(51) Int. Cl.
| | |
|---|---|
| *H04B 10/00* | (2013.01) |
| *H04Q 11/00* | (2006.01) |
| *H04J 14/02* | (2006.01) |
| *H04B 10/80* | (2013.01) |
| *H04J 14/00* | (2006.01) |

(52) U.S. Cl.
CPC ....... *H04Q 11/0005* (2013.01); *H04B 10/801* (2013.01); *H04J 14/02* (2013.01); *H04Q 2011/0016* (2013.01); *H04Q 2011/0039* (2013.01); *H04Q 2011/0058* (2013.01)

(58) Field of Classification Search
CPC ... H04B 10/27; H04B 10/272; H04B 10/2725
See application file for complete search history.

(56) References Cited

U.S. PATENT DOCUMENTS

| | | | |
|---|---|---|---|
| 7,068,873 B2 | 6/2006 | Frankel et al. | |
| 8,582,705 B2 | 11/2013 | Frankel et al. | |
| 9,207,461 B2 | 12/2015 | Frankel et al. | |
| 9,551,836 B2 | 1/2017 | Frankel et al. | |
| 9,602,434 B1 * | 3/2017 | Saleh | H04J 14/08 |
| 9,866,929 B2 | 1/2018 | Frankel et al. | |
| 10,141,926 B2 | 11/2018 | Frankel et al. | |
| 10,200,305 B2 | 2/2019 | Frankel et al. | |
| 10,212,496 B2 | 2/2019 | Frankel et al. | |
| 10,239,749 B2 | 3/2019 | Frankel et al. | |

(Continued)

OTHER PUBLICATIONS

Arpa-e, ENergy-efficient Light-wave Integrated Technology Enabling Networks that Enhance Dataprocessing, Jun. 14, 2017.

(Continued)

*Primary Examiner* — Daniel G Dobson
(74) *Attorney, Agent, or Firm* — Clements Bernard Walker; Lawrence A. Baratta, Jr.; Christopher L. Bernard

(57) ABSTRACT

Systems and methods increase the fan-out (radix) of optical connections that are co-packaged with electric circuits, e.g., Application-Specific Integrated Circuits (ASICs). Optical or electrical techniques are presented to break out multiple data streams from a Photonic Integrated Circuit (PIC) integrated with an ASIC. This provides the ability to increase the I/O capability (radix) of an ASIC, allowing the ASIC to connect to a larger number of devices (e.g., servers). A cross-connect system includes one or more cross-connect devices optically interconnected to 1) a plurality of switches with each switch connected to one or more subtending servers, and 2) a plurality of switch circuits having Photonic Integrated Circuits (PICs) integrated therewith, each of the one or more cross-connect devices is configured to provide fan-out of the plurality of switches between the plurality of switch circuits to increase a number of the subtending servers.

11 Claims, 6 Drawing Sheets

(56) References Cited

U.S. PATENT DOCUMENTS

| | | | |
|---|---|---|---|
| 2015/0043905 A1 | 2/2015 | Graves et al. | |
| 2015/0296278 A1* | 10/2015 | Liu .................... | H04Q 11/0062 398/50 |
| 2016/0057517 A1 | 2/2016 | Coca et al. | |
| 2018/0026632 A1* | 1/2018 | Frankel .................. | H04Q 3/521 327/436 |

OTHER PUBLICATIONS

Defense Advanced Research Projects Agency, Bringing Photonic Signaling to Digital Microelectronics, https://www.darpa.mil/news-events/2018-11-01, pp. 1-3.
Microsoft Corp., Microsoft and Facebook announce formation of the Co-Packaged Optics Collaboration under the Joint Development Foundation, Mar. 14, 2019, pp. 1-3.
CALIENT Technologies, "Photonic Switching Applications in Data Centers & Cloud Computing Networks," 2011, pp. 2-6.
Mar. 26, 2021, International Search Report and Written Opinion for International Application No. PCT/US2020/062796.

\* cited by examiner

SYSTEMS AND METHODS FOR INCREASING GRANULARITY AND FAN-OUT OF ELECTRIC CIRCUITS WITH CO-PACKAGED OPTICAL INTERFACES

FIELD OF THE DISCLOSURE

The present disclosure generally relates to input/output for electrical circuits. More particularly, the present disclosure relates to systems and methods for increasing granularity and fan-out of electric circuits with co-packaged optical interfaces.

BACKGROUND OF THE DISCLOSURE

Data Centers (DC) and High-Performance Computing (HPC) clusters are a critical and growing infrastructure. Their scale ranges anywhere from a few compute and storage servers linked through an Ethernet switch, to Mega Data Centers with 100's of thousands of servers hosted in warehouses the size of several football fields, and consuming ~100 MW of power. The cost of building and equipping a large DC can easily exceed $1B, with the majority of cost being spent on compute and storage servers. Similarly, power consumption is rapidly becoming a limiting factor in DC operation economics. DC equipment cost and operating power are predominantly in compute infrastructure (CPU and Storage) (~70%), and ~20% is in networking equipment. However, as compute capabilities and required bandwidth is increasing, networking requirements are increasing super-linearly. This super-linear scaling of switches and optical links is caused by the inability of switching Application-Specific Integrated Circuits (ASICs) I/O port counts to keep up with the data center bandwidth growth. The capacity increase experienced in the DC networks is far outpacing what the semiconductor industry is able to offer from packet switch circuitry (ASICs). And this problem is likely to be exacerbated going forward. 5G wireless networks, proliferation of Internet of Things (IoT) devices, and edge cached content with massive replication will continue driving huge data bandwidth. However, CMOS lithography and packaging pin limits constrain packet ASIC growth to a much slower rate. A solution is needed that avoids the high Radix requirements being placed on packet ASICs.

The industry has been solving the packet ASIC Radix problem simply by stacking multiple ASICs into larger boxes. But this just hides the problem inside a box, rather than solving it explicitly. The way the industry is attempting to address the problem of constrained switch ASIC I/O (Input/Output) bandwidth includes several directions. First, On-Board Optics (OBO) type approaches help with front-panel space and a little with SERDES (Serialized-De-serializer) power. But OBO approaches do not solve Switch ASIC I/O pin limits, and their benefits along other dimensions is constrained. Next, there is a lot of academic work in integrating optical switch fabrics (often set up in parallel with electrical packet)—fast switching, Wavelength Division Multiplexed (WDM) based, Arrayed Waveguide Grating Router (AWGR) based, commutators, etc. The optical switch fabric problems associated with additional optical loss, slow reconfiguration speed, and control plane integration have so far prevented any practical applications beyond some 'patch panel' simplifications. Further, there is growing academic and commercial industry interest in much tighter integration of optical I/O and switches to increase I/O bandwidth.

Overall, optics is seen as viable only as 'last resort' when electronics are no longer able to deliver the required level of overall performance. This is driven by the huge relative difference in the cost of electronic versus optical interconnect components. For example, a 40G QSFP+ Direct Attach Copper Twinax electrical cable costs X in small volumes. In contrast, a Vertical-Cavity Surface-Emitting Laser (VCSEL) based 40G QSFP+ Active Optical Cable is about 5×. And a Single-Mode Fiber (SMF) duplex fiber link at 1310 nm 40G QSFP+ is about 25×. However, when electrical I/O is no longer viable, optical integration directly into the electronic switch ASIC becomes an economically viable solution. Although the demise of electronics has been predicted several times in the past and has not yet come to pass, it is inevitable that the transition to optics will happen—the electronic industry is running out of packaging pins and running out of electronic signal equalization techniques applicable to low power, short-reach interfaces. Increasing from 25G to 50G per electrical lane marked the first time that it became necessary to move from Non-Return-to-Zero (NRZ) to Pulse Amplitude Modulation-4 (PAM4), as the impact of increasing the bandwidth became a limiting factor in scaling to a higher bitrate. It has become clear that electrical I/Os will begin limiting ASIC capacities.

With the transition to optical interconnects at the circuit level, there is a need for interface techniques.

BRIEF SUMMARY OF THE DISCLOSURE

The present disclosure relates to systems and methods for increasing granularity and fan-out of electric circuits with co-packaged optical interfaces. Specifically, the present disclosure increases the fan-out (radix) of optical connections that are co-packaged with electric circuits, e.g., ASICs. The present disclosure utilizes optical or electrical techniques to break out multiple data streams from a Photonic Integrated Circuit (PIC) integrated with an ASIC. This provides the ability to increase the I/O capability (radix) of an ASIC, allowing the ASIC to connect to a larger number of devices (e.g., servers).

In an embodiment, a cross-connect system includes one or more cross-connect devices optically interconnected to 1) a plurality of switches with each switch connected to one or more subtending servers, and 2) a plurality of switch circuits having Photonic Integrated Circuits (PICs) integrated therewith, each of the one or more cross-connect devices is configured to provide fan-out of the plurality of switches between the plurality of switch circuits to increase a number of the subtending servers. The one or more cross-connect devices can each be an optical cross-connect. The optical cross-connect can utilize optical filters. The optical filters can be one of Coarse Wavelength Division Multiplexing (CWDM) filters and Local Area Network-Wavelength Division Multiplexing (LAN-WDM) filters. The plurality of switches can each include an optical module, and wherein the optical module and a connected PIC can include a same wavelength, format, and bit rate. The one or more cross-connect devices can each be an electrical cross-connect. The electrical cross-connect can include arbitrary rate plugs connected to optical interfaces in the plurality of switches, and one or more PICs connected to the PICs of the plurality of switch circuits. The one or more PICs can be integrated in an electrical switch fabric of the electrical cross-connect. The optical interfaces in the plurality of switches can have one or more of a different wavelength, format, and bit rate from the PICs of the plurality of switch circuits. The electrical cross-connect can be a cross-point switch.

In another embodiment, a method, implemented by one or more cross-connect devices, includes interconnecting to 1) a plurality of switches with each switch connected to one or more subtending servers, and 2) a plurality of switch circuits having Photonic Integrated Circuits (PICs) integrated therewith; and providing fan-out of the plurality of switches between the plurality of switch circuits to increase a number of the subtending servers. The one or more cross-connect devices can each be an optical cross-connect. The optical cross-connect can utilize optical filters. The one or more cross-connect devices can each be an electrical cross-connect. The electrical cross-connect can include arbitrary rate plugs connected to optical interfaces in the plurality of switches, and one or more PICs connected to the PICs of the plurality of switch circuits.

In a further embodiment, a network includes a plurality of switches, each switch is connected to one or more subtending servers; a plurality of switch circuits having Photonic Integrated Circuits (PICs) integrated therewith; and one or more cross-connect devices optically interconnected to 1) the plurality of switches, and 2) the plurality of switch circuits, each of the one or more cross-connect devices is configured to provide fan-out of the plurality of switches between the plurality of switch circuits to increase a number of the subtending servers. The one or more cross-connect devices can each be an optical cross-connect. The optical cross-connect can utilize optical filters. The one or more cross-connect devices can each be an electrical cross-connect. The electrical cross-connect can include arbitrary rate plugs connected to optical interfaces in the plurality of switches, and one or more PICs connected to the PICs of the plurality of switch circuits.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for increasing granularity and fan-out of electric circuits with co-packaged optical interfaces. Specifically, the present disclosure increases the fan-out (radix) of optical connections that are co-packaged with electric circuits, e.g., ASICs. The present disclosure utilizes optical or electrical techniques to break out multiple data streams from a Photonic Integrated Circuit (PIC) integrated with an ASIC. This provides the ability to increase the I/O capability (radix) of an ASIC, allowing the ASIC to connect to a larger number of devices (e.g., servers).

Conventional ASIC Optical I/O

Figure 1:
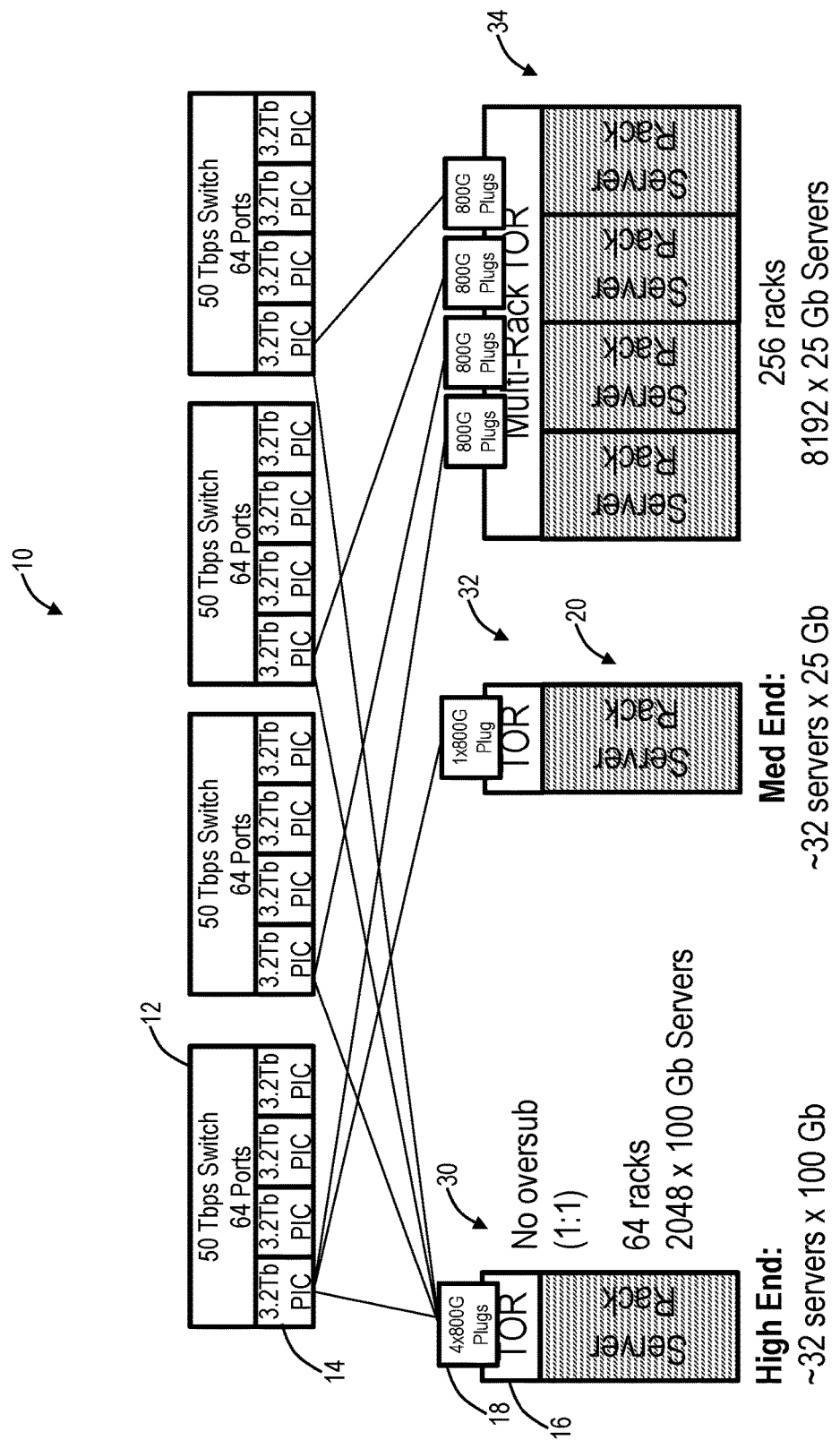
FIG. 1 is a diagram of a conventional architecture with 50+ Tbps switch circuits having optical co-packaged I/O Photonic Integrated Circuits (PICs)

FIG. 1 is a diagram of a conventional architecture 10 with 50+ Tbps switch circuits 12 having optical co-packaged I/O PICs 14, for interconnecting switches 16, such as TOR switches. The switches 16 can include optical interfaces 18, which connect to the PICs 14 optically, and the switch circuits 12 and the switches 16 collectively interconnect servers 20. ASIC optical I/O is constrained by inherent engineering issues, such as a trade-off in the SERDES interface between low-rate CMOS and high-rate optics versus keeping fewer optical channels as limited by laser and optical multiplexer/demultiplexer complexity. Further, the PIC 14 interface will likely prefer designs with high-bandwidth and few fibers. Hence, there is a limited physical port count (i.e., fiber count) in the switch circuits 12 with the PICs 14. This limited physical port count limits East-West scalability. As described herein, East-West scalability includes the ability to scale the number of servers 16, and the term "East-West" is used to logically represent this scaling (it could also be referred to as horizontal scaling).

Assume, for example, the switch circuits 12 are a 51.2 Tbps switch ASIC, which are starting to appear on industry long-range roadmaps (current generation is 12.8 Tbps). FIG. 1 makes the following assumptions for the optical co-packaged I/O PICs 14-16 duplex connections per side (32 fibers or fiber cores per side) for a total of 64 ports per circuit 12 and 51.2 Tbps/64=800 Gbps per fiber link. With 64 ports per switch circuit 12, the East-West scalability is limited to 64 units, which can be a) a high-end server rack 30, b) a medium-end server rack 32, c) a multi-rack aggregate 34, or the like.

Of note, the present disclosure includes various bit rates which are presented for illustration purposes only. Those of ordinary skill in the art will recognize different bit rates are also contemplated with the various embodiments described herein.

Increasing Fan-Out

The objective of the present disclosure is to provide a system and method to overcome the aforementioned network architecture issues, namely to overcome the 64-unit limit (used as an example) in FIG. 1, for a fan-out of high bandwidth single fiber interfaces to multiple physical locations to support East-West scalability, for signal format translation between co-packaged ASIC I/O and standards-compliant signals (from pluggable modules, on-board, etc.) on other networking components, to allow use of non-standards signals for PIC 14 to PIC 14 connections as well as standards-compliant signals enabling connecting to industry-standard pluggable modules.

The present disclosure includes two example embodiments—a purely optical cross-connect approach and an electrical cross-connect approach, to break out multiple data streams from a PIC 14. This provides a technique of increasing the I/O capability of an ASIC and allowing the ASIC to connect to larger numbers of servers. Using different PICs 14 based on the granularity of traffic needed to break out (50G, 100G) provides additional flexibility—the switch circuit 12 could have data streams at multiple rates depending on server requirements.

In an embodiment, a cross-connect system includes one or more cross-connect devices optically interconnected to 1) a plurality of switches with each switch connected to one or more subtending servers, and 2) a plurality of switch circuits having Photonic Integrated Circuits (PICs) integrated therewith, each of the one or more cross-connect devices is configured to provide fan-out of the plurality of switches between the plurality of switch circuits to increase the number of the subtending servers.

In another embodiment, a method, implemented by one or more cross-connect devices, includes interconnecting to 1) a plurality of switches with each switch connected to one or more subtending servers, and 2) a plurality of switch circuits having Photonic Integrated Circuits (PICs) integrated therewith; and providing fan-out of the plurality of switches between the plurality of switch circuits to increase a number of the subtending servers.

In a further embodiment, a network includes a plurality of switches, each switch is connected to one or more subtending servers; a plurality of switch circuits having Photonic Integrated Circuits (PICs) integrated therewith; and one or more cross-connect devices optically interconnected to 1) the plurality of switches, and 2) the plurality of switch circuits, each of the one or more cross-connect devices is configured to provide fan-out of the plurality of switches between the plurality of switch circuits to increase a number of the subtending servers.

Optical Cross-Connect Approach

Figure 2:
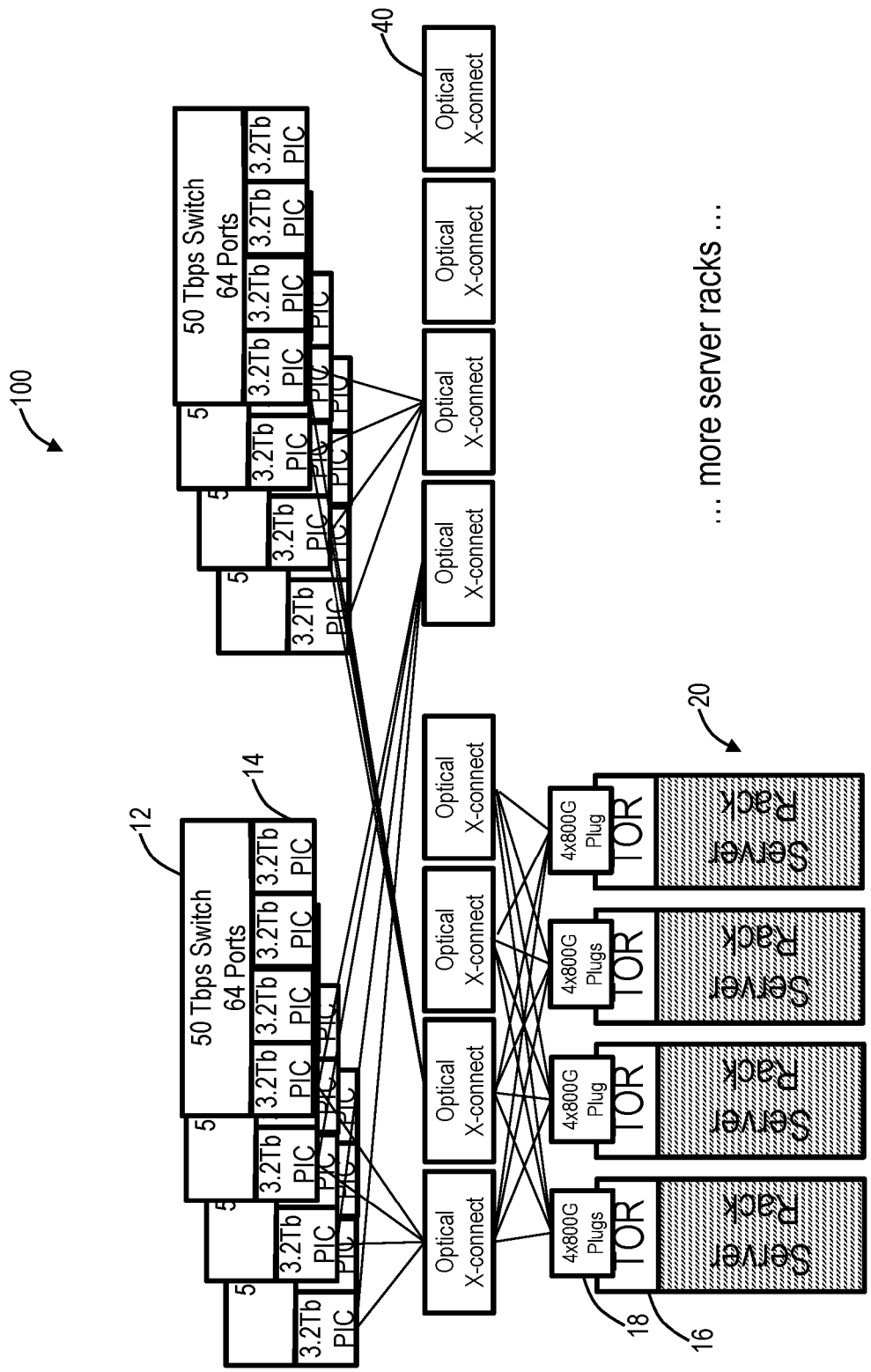
FIG. 2 is a diagram of an architecture with 50+ Tbps switch circuits having optical co-packaged I/O PICs with an optical cross-connect to increase fan-out.

FIG. 2 is a diagram of an architecture 100 with 50+ Tbps switch circuits 12 having optical co-packaged I/O PICs 14 with an optical cross-connect 40 to increase fan-out. Here, the optical cross-connect 40 has ports connected to the optical interfaces 18 on the switches 16 and ports connected to the PICs 14 on the switch circuits 12. This approach provides a breakout and cross-connect of individual optical wavelengths. This is useful in cases when the co-packaged optical PIC 14 is compatible in terms of optical specifications with modules, such as the optical interfaces 18, on the rest of the network, and may be most beneficial when signals match standards-compliant formats.

For example, the optical interfaces 18 can be standards compliant modules, such as 400GBASE-FR4, FR8, LR4, DR4, etc. The following table illustrates examples of standards-compliant modules and corresponding wavelengths (in nanometers)/structure for the optical cross-connect 40.

| Standards Compliant Module | Optical X-connect |
| --- | --- |
| FR4: 2 km, 4 dB loss, SMF duplex | Coarse Wave Division Multiplexing (CWDM): 1271, 1291, 1311, 1331 |
| FR8: 2 km, 4 dB loss, SMF duplex | Local Area Network-Wavelength Division Multiplexing (LAN-WDM): 1273.55, 1277.89, 1282.26, 1286.66, 1295.56, 1300.05, 1304.58, 1309.14 |
| LR4: 10 km, 6.3 dB loss, SMF duplex | LAN-WDM: 1295.56, 1300.05, 1304.58, 1309.14 |
| DR4: 500 m, 3 dB loss, parallel fiber | Fiber cross-connect swap |

The architecture 100 in FIG. 2 is similar to the architecture 10 in FIG. 1 with the addition of the optical cross-connect 40 devices between the switch circuits 12 and the switches 16. As mentioned in FIG. 1, with the example specifications, the architecture 10 is limited to 64 racks (i.e., 64 switches 16). In the example of FIG. 2, the optical cross-connect 40 devices expand the fan-out to 4×64 racks (switches 16).

Figures 3, 4:
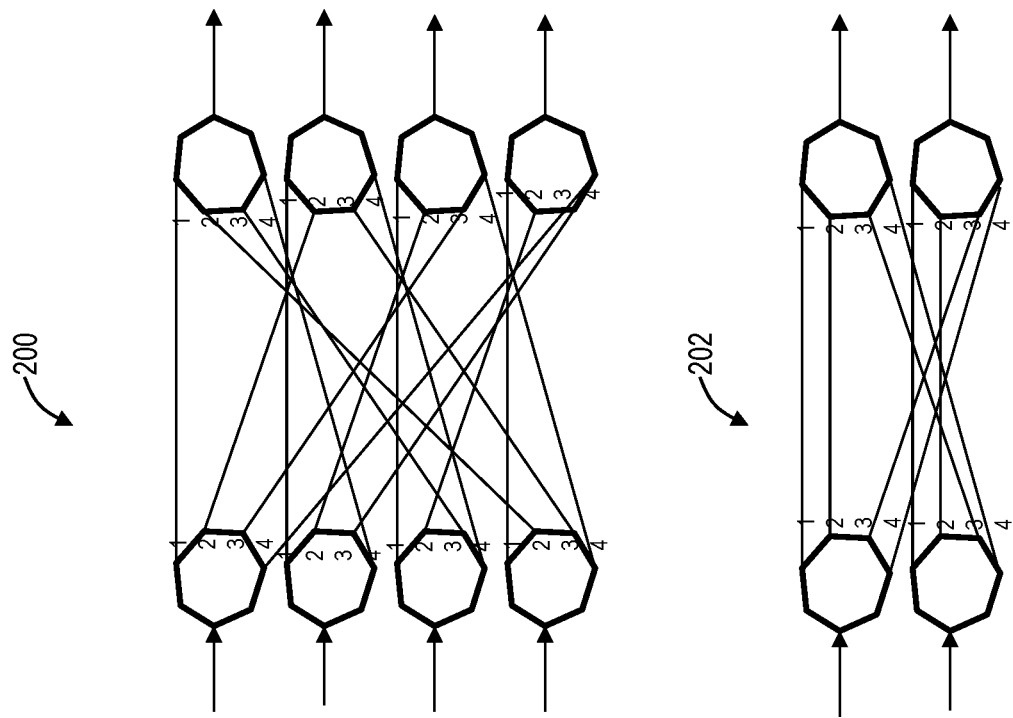
FIG. 3 is a diagram of an optical cross-connect implementation using optical filters to support four ports with single wavelength granularity.
FIG. 4 is a diagram of an optical cross-connect implementation using optical filters to support four ports with dual-wavelength granularity.

In an embodiment, the optical cross-connect 40 devices can be implemented using optical filters. FIG. 3 is a diagram of an optical cross-connect 200 implementation using optical filters to support four ports with single wavelength granularity. FIG. 4 is a diagram of an optical cross-connect implementation 202 using optical filters to support four ports with dual-wavelength granularity. Specifically, the optical cross-connect 200, 202 implementations are for a four-wavelength configuration as in 400GBASE-FR4. The optical cross-connect 200 shows a maximum expansion of FR4 to 4×64 fan-out using single wavelengths. The optical cross-connect 202 shows a smaller expansion using wavelengths in pairs, e.g., FR4 to 2×64 fan out.

The optical cross-connects 200, 202 can utilize CWDM or LAN-WDM optical filters and support a maximum expansion factor equal to a number of wavelengths (or fibers). The optical interfaces 18 on the switches 16 must match the PICs 14, in terms of wavelengths, bit rate, format, etc. There is a requirement for at least an extra 1 dB link loss budget to compensate for the loss of the optical cross-connect 40. The optical cross-connect approach can support a mix of rates in a single switch—for example, there could be 3.2 Tb/s PIC modules implemented using either 50 or 100G per wavelength.

Electrical Cross-Connect Approach

Figure 5:
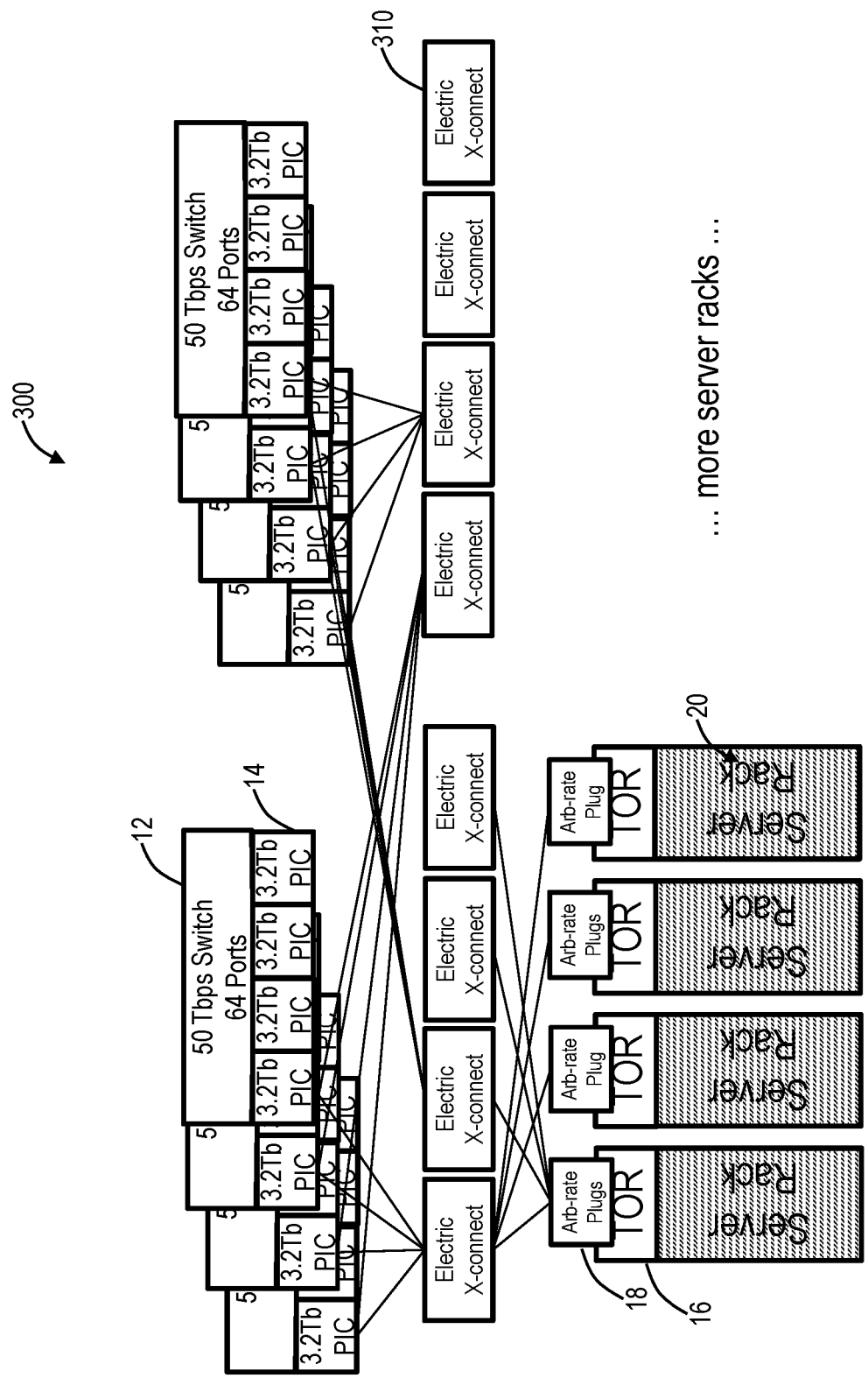
FIG. 5 is a diagram of an architecture with 50+ Tbps switch circuits having optical co-packaged I/O PICs with an electrical cross-connect to increase fan-out.

FIG. 5 is a diagram of an architecture 300 with 50+ Tbps switch circuits 12 having optical co-packaged I/O PICs 14 with an electrical cross-connect 310 to increase fan-out. Here, the electrical cross-connect 310 has ports connected to the optical interfaces 18 on the switches 16 and ports connected to the PICs 14 on the switch circuits 12. This approach provides a breakout and cross-connect at a granularity that may be much finer than the optical wavelength. This is useful in cases when the co-packaged optical PIC 14 is not optical-spec compatible with the optical interfaces 18 on the rest of the network and benefits from a) translating optical signals, and b) providing much finer cross-connect granularity and therefore much higher East-West scalability.

FIG. 5 uses the same example numbers as FIGS. 1-2. It should be noted that the architecture 300 can provide much higher East-West scalability due to potentially finer granularity and signal remapping. Further, the TOR-side plug (the optical interfaces 18) may use a different fiber type or possibly an electrical media, such as Twinax.

Figure 6:
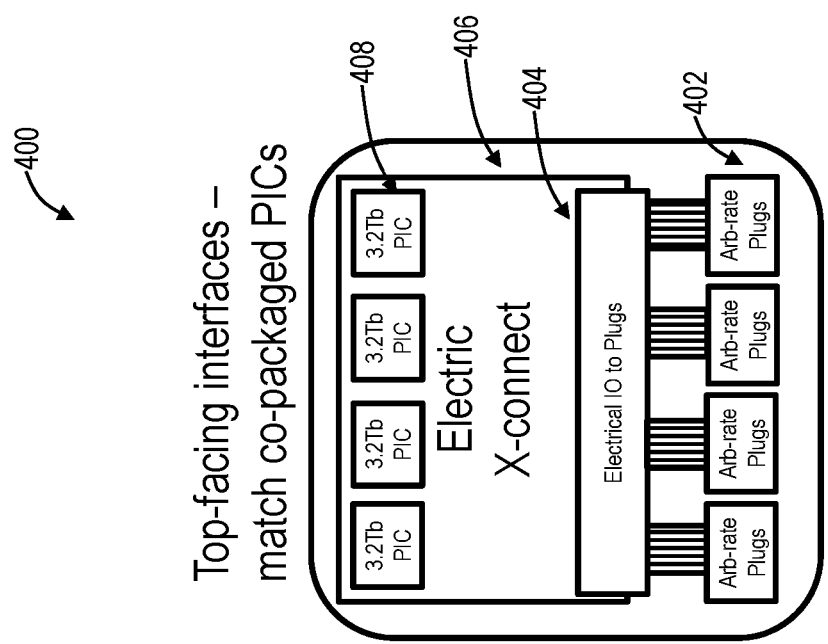
FIG. 6 is a block diagram of an example implementation of an electrical cross-connect.

FIG. 6 is a block diagram of an example implementation of an electrical cross-connect 400. The electrical cross-connect 400 may include arbitrary rate plugs 402 that are configured to connect to the optical interfaces 18. Of course, fixed rate plugs may also be used. The arbitrary rate plugs 402 can support multiple protocols, bit rates, wavelengths, formats, etc. to match the optical interfaces 18. The arbitrary rate plugs 402 connect via electrical I/O circuitry 404, which connects to an electrical switch fabric 406. The electrical switch cross-connect fabric 406 connects to PICs 408, which connect to the PICs 14. The cross-connect fabric 406 could be a switch or a simple cross-connect. Note, the PICs 14, 408 support the same protocols, bit rates, wavelengths, formats, etc.

The switching in the electrical cross-connect fabric 406 could be as simple as a completely static electric remapping (as in wavelengths), cross-point space-switch, a fabric cell switch, or could be a packet switch depending on requirements. The electrical cross-point is expected to be much lower power than the corresponding packet ASIC and can be scaled to provide much higher bandwidth throughput, especially if implemented using multiple ASIC packages.

Process

Figure 7:
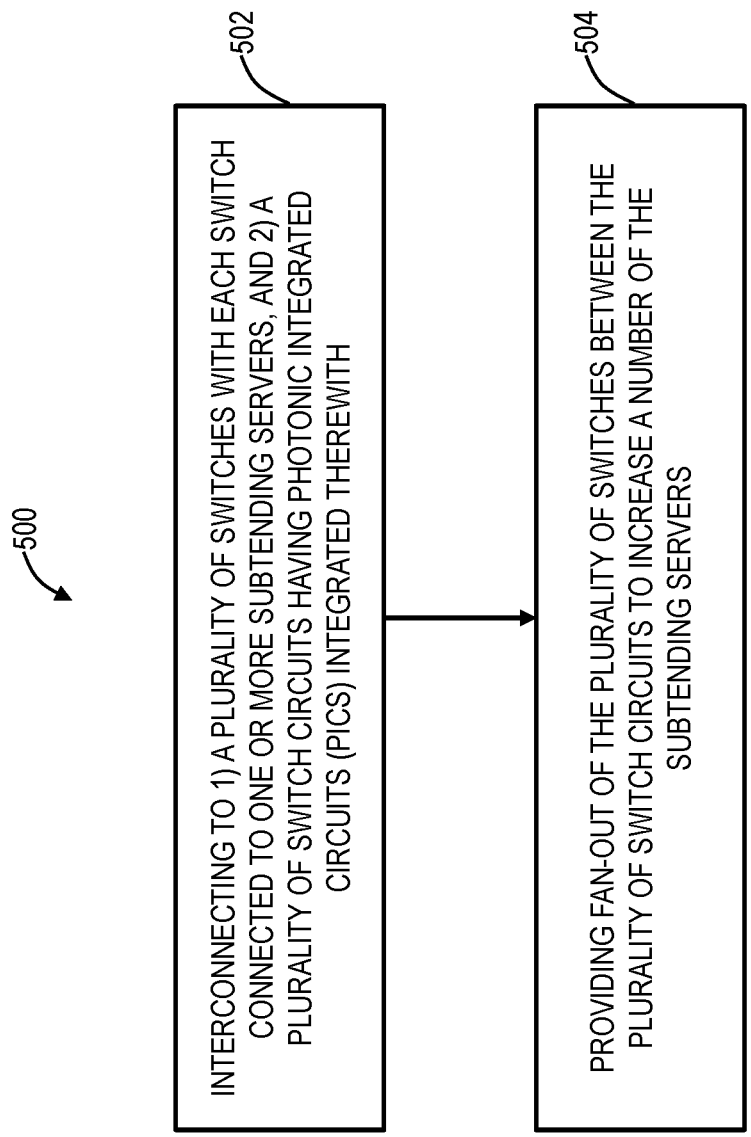
FIG. 7 is a flowchart of a fan-out improvement process.

FIG. 7 is a flowchart of a fan-out improvement process 500, implemented in the optical cross-connect 40 or the electrical cross-connect 310. The process 500 includes interconnecting to 1) a plurality of switches with each switch connected to one or more subtending servers, and 2) a plurality of switch circuits having Photonic Integrated Circuits (PICs) integrated therewith (step 502); and providing fan-out of the plurality of switches between the plurality of switch circuits to increase a number of the subtending servers (step 504).

In an embodiment, the one or more cross-connect devices are each an optical cross-connect. The optical cross-connect can utilize optical filters. The optical filters can be one of Coarse Wavelength Division Multiplexing (CWDM) filters and Local Area Network-Wavelength Division Multiplexing (LAN-WDM) filters. The plurality of switches can each include an optical module, and wherein the optical module and a connected PIC include a same wavelength, format, and bit rate.

In another embodiment, the one or more cross-connect devices are each an electrical cross-connect. The electrical cross-connect can include arbitrary rate plugs connected to optical interfaces in the plurality of switches, and one or more PICs connected to the PICs of the plurality of switch circuits. The one or more PICs can be integrated in an electrical switch fabric of the electrical cross-connect. The optical interfaces in the plurality of switches can have one or more of a different wavelength, format, and bit rate from the PICs of the plurality of switch circuits. The electrical cross-connect can be a cross-point switch.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more ASICs, in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A cross-connect system comprising:
   one or more cross-connect devices optically interconnected to 1) a plurality of switches with each switch connected to one or more subtending servers, and 2) a plurality of switch circuits having Photonic Integrated Circuits (PICs) integrated therewith, each of the one or more cross-connect devices is configured to provide fan-out of the plurality of switches between the plurality of switch circuits to increase a number of the subtending servers,
   wherein the one or more cross-connect devices are each an optical cross-connect, and wherein the plurality of switches each include an optical module, and wherein the optical module and a connected PIC include a same wavelength, format, and bit rate.

2. The cross-connect system of claim 1, wherein the optical cross-connect utilizes optical filters.

3. The cross-connect system of claim 2, wherein the optical filters are one of Coarse Wavelength Division Multiplexing (CWDM) filters and Local Area Network-Wavelength Division Multiplexing (LAN-WDM) filters.

4. A method, implemented by one or more cross-connect devices, comprising:
   interconnecting to 1) a plurality of switches with each switch connected to one or more subtending servers, and 2) a plurality of switch circuits having Photonic Integrated Circuits (PICs) integrated therewith; and
   providing fan-out of the plurality of switches between the plurality of switch circuits to increase a number of the subtending servers,
   wherein the one or more cross-connect devices are each an electrical cross-connect that includes arbitrary rate plugs connected to optical interfaces in the plurality of switches, and one ore more PICs connected to the PICs of the plurality of switch circuits.

5. The method of claim 4, wherein the one or more PICs are integrated in an electrical switch fabric of the electrical cross-connect.

6. The method of claim 5, wherein the optical interfaces in the plurality of switches have one or more of a different wavelength, format, and bit rate from the PICs of the plurality of switch circuits.

7. The method of claim 4, wherein the electrical cross-connect is a cross-point switch.

8. A cross-connect system comprising:
   one or more cross-connect devices optically interconnected to 1) a plurality of switches with each switch connected to one or more subtending servers, and 2) a plurality of switch circuits having Photonic Integrated Circuits (PICs) integrated therewith, each of the one or more cross-connect devices is configured to provide fan-out of the plurality of switches between the plurality of switch circuits to increase a number of the subtending servers, wherein the one or more cross-connect devices are each an electrical cross-connect that includes arbitrary rate plugs connected to optical interfaces in the plurality of switches, and one or more PICs connected to the PICs of the plurality of switch circuits.

9. The cross-connect system of claim 8, wherein the one or more PICs are integrated in an electrical switch fabric of the electrical cross-connect.

10. The cross-connect system of claim 9, wherein the optical interfaces in the plurality of switches have one or more of a different wavelength, format, and bit rate from the PICs of the plurality of switch circuits.

11. The cross-connect system of claim 8, wherein the electrical cross-connect is a cross-point switch.

* * * * *